United States Patent [19]
Kosugi et al.

[11] Patent Number: 5,606,469
[45] Date of Patent: Feb. 25, 1997

[54] METHOD FOR CORRECTING OFFSET IN A MAGNETIC DISK INCLUDING APPARENT OFFTRACK CANCELLATION

[75] Inventors: Tatsuhiko Kosugi; Nobuyuki Suzuki, both of Kawasaki, Japan

[73] Assignee: Fujitsu Limited, Japan

[21] Appl. No.: 363,983

[22] Filed: Dec. 23, 1994

Related U.S. Application Data

[63] Continuation of Ser. No. 20,682, Feb. 22, 1993, abandoned.

[30] Foreign Application Priority Data

Mar. 30, 1992 [JP] Japan ................................. 4-074445

[51] Int. Cl.⁶ .................................................. G11B 5/596
[52] U.S. Cl. ................................. 360/77.05; 360/77.04
[58] Field of Search ............................ 360/77.05, 77.04, 360/77.08, 75

[56] References Cited

U.S. PATENT DOCUMENTS

| | | | |
|---|---|---|---|
| 4,620,243 | 10/1986 | Bakken et al. | 360/77.05 |
| 5,050,016 | 9/1991 | Squires | 360/77.08 |
| 5,073,833 | 12/1991 | Best et al. | 360/77.05 |
| 5,185,681 | 2/1993 | Volz et al. | 360/77.04 X |
| 5,220,468 | 6/1993 | Sidman | 360/77.05 |

FOREIGN PATENT DOCUMENTS

| | | |
|---|---|---|
| 63-279569 | 12/1987 | Japan . |
| 63-56885 | 3/1988 | Japan . |

*Primary Examiner*—Aristotelis Psitos
*Assistant Examiner*—James T. Wilson
*Attorney, Agent, or Firm*—Greer, Burns, & Crain, Ltd.

[57] ABSTRACT

A method for writing a servo pattern in a hard disk device comprises the steps of reproducing a first servo signal from a servo surface, recording a second servo pattern on a recording surface using a data head by controlling the data head on a track defined on the recording surface, reproducing a second servo signal from the recording surface in response to the second servo pattern recorded thereon using the data head, detecting an off-track of the data head with respect to the predetermined track on the recording surface; shifting the data head in a radial direction of the recording surface with an offset such that the off-track is canceled, and recording a third servo pattern on the recording surface using the data head at a position determined in the step of shifting the data head.

5 Claims, 10 Drawing Sheets

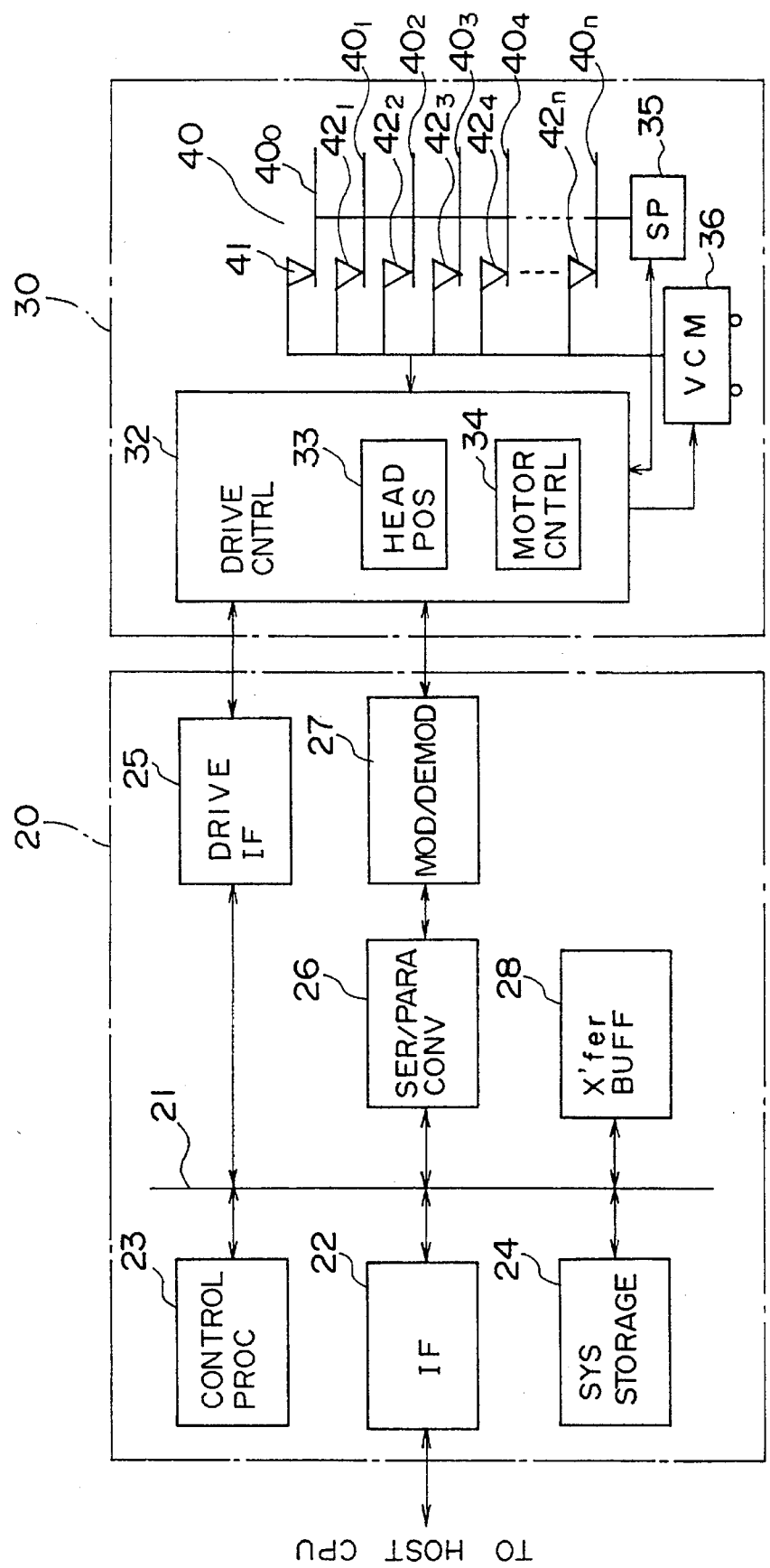

METHOD FOR CORRECTING OFFSET IN A MAGNETIC DISK INCLUDING APPARENT OFFTRACK CANCELLATION

RELATED APPLICATION

This is a continuation of application Ser. No. 020,682, filed on Feb. 22, 1993 now abandoned.

BACKGROUND OF THE INVENTION

The present invention generally relates to magnetic storage devices, and more particularly to an improvement of control of magnetic heads in the so-called hard disk devices.

Hard disk devices are used extensively as a large capacity, high speed auxiliary magnetic storage device of computers. A typical hard disk device includes a rigid magnetic disk revolving at a high speed and a magnetic head carried on a swing arm for scanning the recording surface of the magnetic disk at a high speed. In response to the swinging motion of the swing arm, the magnetic head scans the recording surface of the magnetic disk generally in the radial direction thereof. Generally, the magnetic disk is revolved at a high speed in the order of several thousand r.p.m., and the magnetic head achieves the recording and reproduction of information signals on and from the magnetic disk while being separated therefrom by a thin air foil.

A typical hard disk device includes a number of magnetic disks mounted on a common hub for simultaneous revolution, and each magnetic disk includes a cooperating magnetic head that is held on a cooperating swing arm. There are a plurality of swing arms and plurality of magnetic heads in correspondence to the plurality of magnetic disks, and the foregoing plurality of swing arms are formed as a unitary body and held rotatably about a common swing axis. As a result, the foregoing plurality of magnetic heads, held on the respective swing arms, scan the surface of the magnetic disks simultaneously.

In such a conventional hard disk device, in order to achieve a proper tracking of the magnetic head for each of the magnetic disks, a magnetic servo pattern is recorded on one of the plurality of magnetic heads, and the magnetic head that cooperates with the magnetic disk on which the magnetic servo pattern is recorded, is controlled to trace the track pattern defined in the form of the magnetic servo pattern. As the other magnetic heads, cooperating with the other magnetic disks, are held unitarily to the magnetic head that traces the magnetic servo pattern, the tracking of magnetic heads is also achieved in the other magnetic disks.

FIG. 1 shows the internal construction of such a conventional hard disk device in plan view, wherein the left side of the drawing shows the state wherein the upper cover of the device is removed, while the right side shows a magnetic disk 11 forming a part of a multiple-stack magnetic disk assembly 10 and an arm assembly 12 that cooperates thereto.

Referring to FIG. 1, each magnetic disk 11 is mounted on a hub 11a that is driven by a motor not illustrated, and the arm assembly 12 includes a swing arm 12b held rotatably about an axis 12a and a magnetic head 12c provided on a free end of the arm 12b. Further, the arm 12b carries a coil 12d forming a part of a voice coil motor 13 at an opposite free end thereof. There, it will be noted that the coil 12d is wound in a plane substantially parallel to the scanning surface of the arm 12b, and magnets 13a and 13b forming a part of the voice coil motor 13 are disposed respectively at the upper side and the lower side of the coil 12d. Thereby, the energization of the coil 12d causes a swinging motion of the arm 12 about the axis 12a, and the energization of the coil 12d is controlled such that the magnetic head 12c on the arm 12b traces a track 11b defined on the magnetic disk 11.

FIG. 2 shows the internal structure of the hard disk device of FIG. 1.

Referring to FIG. 2, the multiple-stack magnetic disk assembly 10 includes a plurality of magnetic disks $11_1$, $11_2$, . . . held commonly on the rotary hub 11a, and in correspondence thereto, the arm assembly 12 is formed as an assembly of a number of arms 12b. Each arm 12b is held on a common rotary member 12e that is held rotatable about the axis 12a, and the arms 12b cause a simultaneous rotation in response to the rotational motion of the rotary member 12e, which of course is formed as a result of energization of the member 12e. Further, the entire mechanism of the hard disk device is accommodated in a hermetically sealed container 1.

In the conventional hard disk device having such a construction, one of the magnetic disk forming multiple-stack magnetic disk assembly 10 such as a magnetic disk $11_1$ is recorded with a magnetic servo pattern in correspondence to the track that is defined thereon. Thereby, the side of the disk $11_1$ that carries the servo pattern acts as a servo surface. Thus, by controlling the magnetic head that cooperates with the servo surface of the magnetic disk $11_1$ to follow the servo control pattern thereon, one can achieve the tracking also for other magnetic heads cooperating with other magnetic disks or other recording surfaces.

In the recent hard disk devices wherein the recording density is increased significantly, the interval between the tracks is reduced and the control of the magnetic head based upon the foregoing servo pattern on the servo surface alone tends to be insufficient. More particularly, the environment, particularly the temperature, in which the device is used, tends to influence the tracking control and there is a substantial risk that the magnetic head may offset from the proper track even when controlled properly based upon the servo pattern on the servo surface.

In order to remedy the foregoing problem of off-track and to achieve a more reliable positional control of the magnetic heads, there is a technique to record a servo pattern also on the recording surface of individual magnetic disks, such that the servo control is achieved based upon the disk servo pattern in addition to the servo pattern on the servo surface. There, the positional deviation of the magnetic head on the individual magnetic disk is corrected or calibrated with respect to the servo pattern on the servo surface based upon the disk servo pattern, and a correct tracking is guaranteed on each of the magnetic disks.

FIG. 3 shows an example of the disk servo pattern that may be provided at the peripheral region of the magnetic disk. Alternatively, such a disk servo pattern may be provided on a particular sector defined on the magnetic disk.

Referring to FIG. 3, the disk servo pattern includes a number of mutually isolated pattern elements SP disposed alternately at both sides of a line I that coincides to a track on the magnetic disk. There, each pattern element SP includes an alternate repetition of mutually opposing magnetic polarizations repeated in the rotational direction of the magnetic disk, and the offset of the magnetic disk with respect to the proper track is detected based upon the electric signal reproduced by the magnetic head upon scanning the pattern elements SP.

FIG. 4(A) shows the waveform of the electric signal reproduced in response to the disk servo pattern by a magnetic head that is properly centered on the track I, wherein it will be noted that the electric signal reproduced in response to the pattern elements SP located above the line I in FIG. 3 and the electric signal reproduced in response to the pattern elements SP located below the line I in the illustration of FIG. 3 have the same amplitude. On the other hand, when the magnetic head is offset from the proper center I of the track for example in the upward direction in FIG. 3, the electric signal reproduced in response to the pattern element SP located above the line I has an amplitude much larger than the electric signal reproduced in response to the pattern element SP located below the line I as indicated in FIG. 4(B).

FIGS. 5(A) and 5(B) show the level of the reproduced electric signal corresponding to the magnetization of the disk servo pattern SP described above, wherein it will be noted that FIG. 5(A) shows the on-track state corresponding to FIG. 4(A) while FIG. 5(B) shows the off-track state corresponding to FIG. 4(B). As the meaning of FIGS. 5(A) and 5(B) is obvious from FIGS. 4(A) and 4(B), further description will be omitted except that the magnetic head is represented as DH in FIGS. 5(A) and 5(B).

Thus, by detecting the electric signals reproduced by the magnetic head in response to the pattern elements SP, one can detect and correct the offset of the magnetic head with respect to the track. For example, the offset thus detected is stored in a memory for subsequent compensation for the head position. There, the position of the magnetic head that is specified based upon the servo pattern on the servo surface is corrected by the offset stored in the memory. Such a correction may be achieved periodically for compensating for the temperature-induced variation of the magnetic head. The recording of the disk servo pattern is achieved in a stabilized state of the apparatus, for example after running continuously for several hours. Thereby, the disk servo pattern SP is written at both sides of the track center I symmetrically.

In the hard disk device of the foregoing type, the detection of positional deviation of the magnetic head is achieved properly as long as the magnetic head has a symmetrical recording and reproducing characteristics as shown in FIGS. 5(A) and 5(B). On the other hand, when the magnetic head is mounted on the swing arm with a slight distortion or when there is an error in the fabrication of the magnetic head, there can occur a case shown in FIG. 6(A) wherein the level of magnetization in each servo pattern element SP is asymmetric with respect to the radial direction of the magnetic disk. When this is the case, the reproduced electric signal corresponding to the pattern SP at the left of the line I of FIG. 6(A) takes a larger amplitude as compared to the reproduced electric signal that corresponds to the pattern SP at the right of the line I, even when the magnetic head is positioned exactly on the track center I. Thereby, the reproduced electric signal has a waveform as shown in FIG. 6(B) that is similar to the waveform of FIG. 4(B) that represents the off-track of the head.

Thus, the conventional hard disk device has a problem of erroneously compensating for the deviation of the magnetic head based upon the false disk servo pattern PL.

SUMMARY OF THE INVENTION

Accordingly, it is a general object of the present invention to provide a novel and useful method for recording a disk servo pattern on a magnetic disk, wherein the foregoing problems are eliminated.

Another and more specific object of the present invention is to provide a method for recording a disk servo pattern on a magnetic disk that forms a part of a magnetic disk apparatus and used also for recording data thereon in addition to the disk servo pattern, wherein the problem of erroneous detection of off-track of a magnetic head, caused by an asymmetric recording/reproduction characteristics of the magnetic head, is successfully eliminated.

Another object of the present invention is to provide a method for writing a servo pattern in an information storage device, said information storage device comprising: a servo surface for storing a first servo pattern; a data surface for storing data and a second servo pattern; a servo head for reproducing a first servo signal from said servo surface; a data head for reproducing a data signal and a second servo signal from said data surface; a head position detection unit for detecting a position of said servo head based upon said first servo signal; and data head control unit for controlling a position of said data head based upon said position of said servo head; said method comprising the steps of:

recording said second servo pattern on said data surface by said data head while controlling a position of said data head based upon said position of said servo head;

reproducing said second servo signal from said data surface by said data head in response to said second servo pattern that has been recorded previously on said data surface while controlling the position of said data head based upon said position of said servo head;

detecting a deviation in said second servo signal that indicates an apparent off-track of said data head from said track while controlling the position of said data head based upon said position of said servo head; and recording a third servo signal on said data surface while shifting said data head in a radial direction of said data surface with an offset such that said apparent off-track is canceled.

According to the present invention, it is possible to eliminate the positional deviation of the head that is caused by the erroneous detection of the second servo pattern on the recording surface, by re-writing the reference servo pattern on the recording surface based upon the first servo pattern as the third servo pattern. Thereby, a reliable recording and reproducing of information signals can be achieved even when the head has a distortion or asymmetricity in the recording and reproducing characteristics.

Other objects and further features of the present invention will become apparent from the following detailed description when read in conjunction with the attached drawings.

BRIEF DESCRIPTION OF THE DRAWINGS

FIG. 7 is a block diagram showing the general construction of the hard disk device used in the present invention;

DETAILED DESCRIPTION OF THE PREFERRED EMBODIMENTS

FIG. 7 shows the construction of the hard disk device that is used in the present invention.

Figure 2:
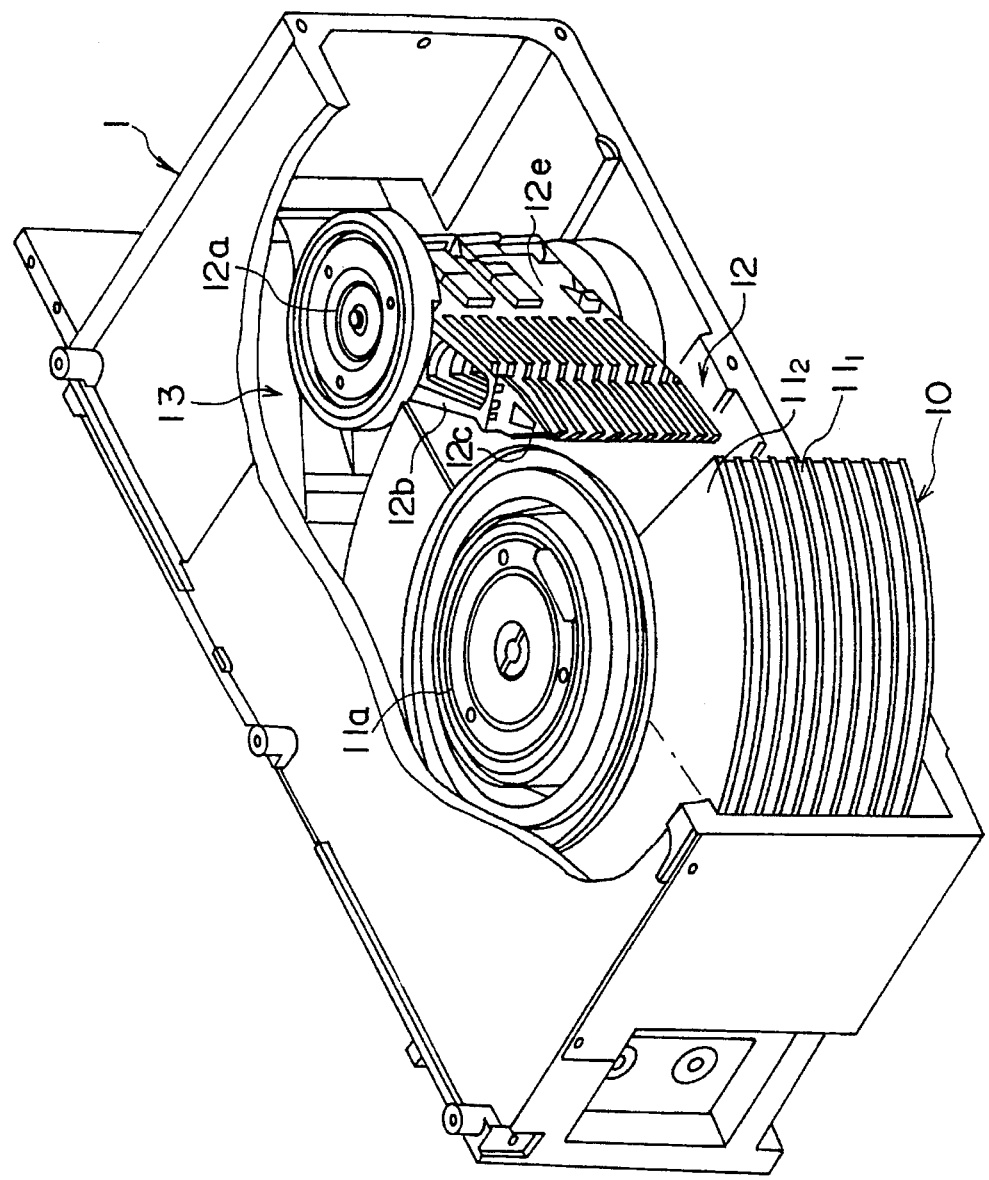
FIG. 2 is a diagram showing the mechanism of the conventional hard disk device of FIG. 1 in a perspective view.

Referring to FIG. 7, the hard disk device includes a disk drive unit 30 and a control unit 20, wherein the disk drive unit 30 includes a stacked magnetic disk assembly 40 that corresponds to the magnetic disk assembly 10 of FIG. 2. There, the magnetic disk assembly 40 includes a number of mutually stacked magnetic disks $40_1$–$40_n$, wherein the magnetic disks $40_1$–$40_n$ are mounted on a common hub and revolved simultaneously by a motor 35. In addition, there is provided a special magnetic disk $40_0$ that carries a servo pattern on the entire surface thereof such that the disk $40_0$ is revolved about the common hub together with and simultaneously to the other magnetic disks $40_1$–$40_n$. In the illustrated example, the disk $40_0$ is provided at the top of the disk assembly 40. This, of course, is not a necessary requirement for constructing a hard disk device, and the disk $40_0$ may be provided at any level of the disk assembly 40.

Figure 3:
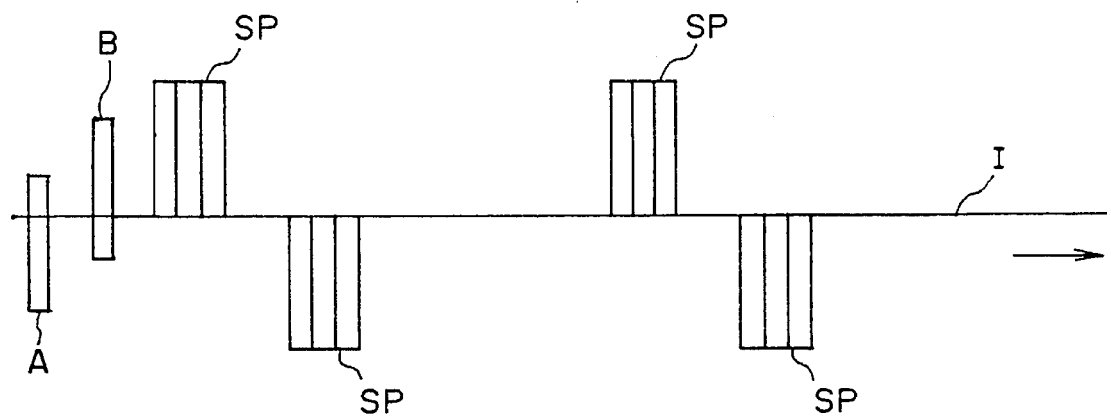
FIG. 3 is a diagram showing an example of the servo pattern recorded on a recording surface of a magnetic disk in the conventional hard disk device of FIG. 1.

Similarly to the conventional hard disk devices, each of the magnetic disks $40_1$–$40_n$ carries a recording surface at respective upper and lower major surfaces, and corresponding magnetic heads $42_1$–$42_n$ achieves recording and/or reproducing of an information signal on and from the cooperating recording surfaces. In the illustration of FIG. 7, the magnetic head is shown to cooperate only with the upper major surface of the magnetic disks. However, it should be noted that this is merely for the sake of simplicity of illustration and the magnetic heads may be provided also to cooperate with the lower major surface of the magnetic disk. In addition, the servo disk $40_0$ may carry a recording surface at the side opposite to a servo surface on which the servo pattern is recorded. In correspondence to the servo pattern, a servo head 41 is provided for reproducing a servo control signal therefrom. It should be noted that the each of the magnetic disks $40_1$–$40_n$ carries a reference track on which a disk servo pattern described with reference to FIG. 3 is recorded for correcting the offset of the magnetic head with respect to the corresponding track on the servo disk $40_0$.

Figure 1:
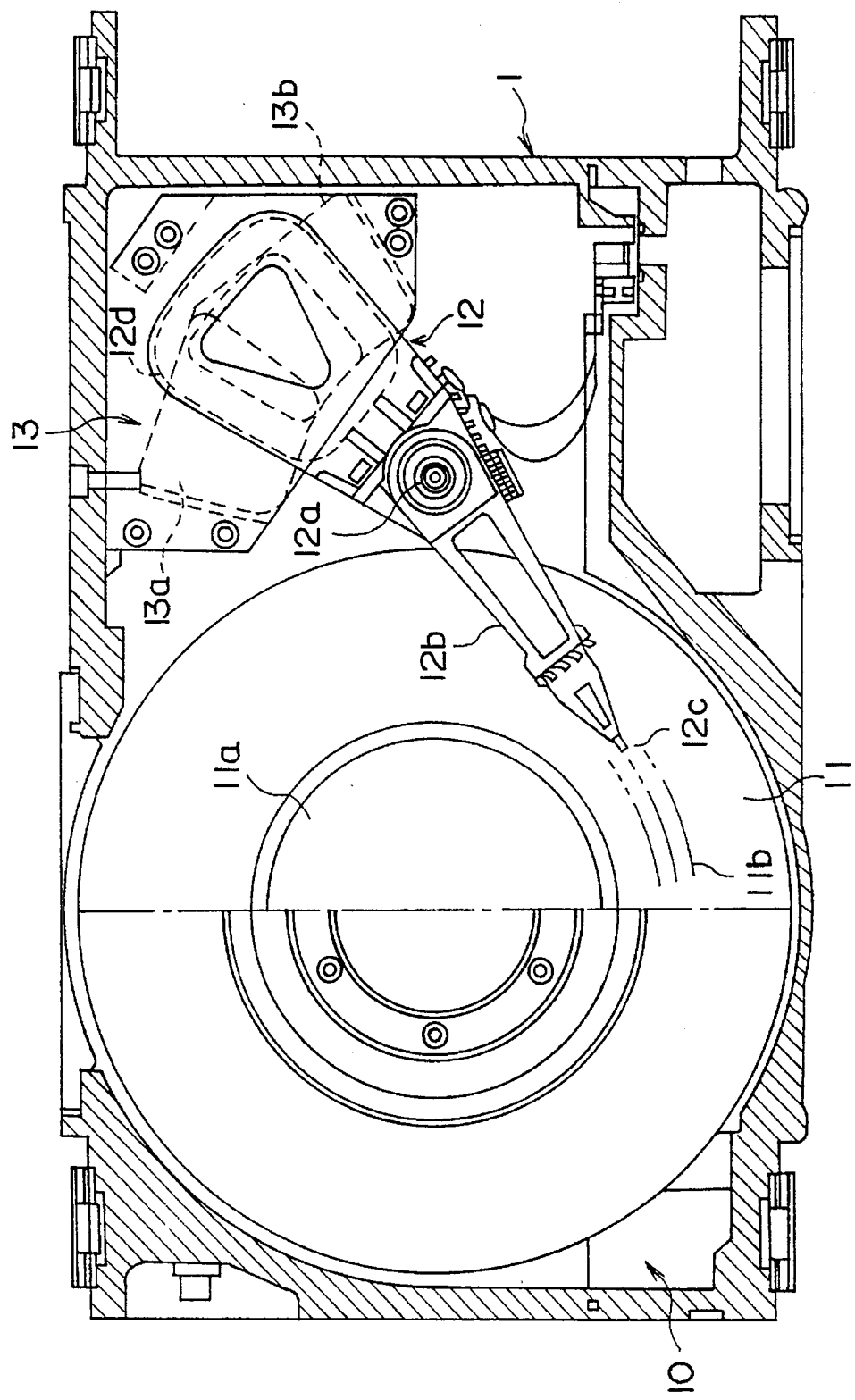
FIG. 1 is a diagram showing the interior of a conventional hard disk device in a plan view.

Further, similarly to the conventional construction of FIG. 2, the magnetic heads $42_1$–$42_n$ as well as the servo head 41 are held unitarily on a swing arm mechanism and are moved simultaneously by a voice coil motor 36 that corresponds to the voice coil motor 13 of FIG. 1.

In addition, the disk drive unit 30 includes a drive control unit 32 that includes a head position control unit 33 and a motor control unit 34 that controls the spindle motor 35 such that the motor 35 revolves at a constant speed. The head position control unit 33, in turn, is supplied with a reproduced servo control signal from the servo head 41 and controls the voice coil motor 36 in response thereto as will be described in detail later.

The control unit 20, in turn, includes an internal bus 21 that is connected to a host CPU not illustrated, by an interface unit 22. The control unit 20 includes a system control processor 23 that controls the disk drive unit 30 based upon the instruction and data that are supplied from the host CPU, and a system storage unit 24 cooperates with the processor 23 via the system bus 21 as usual. The control data produced by the processor 23, in turn, is transferred to a drive interface unit 25 and further to the head position control unit 33 for controlling the voice coil motor 36.

The data transmitted from the host CPU is received at a serial/parallel converter 26 after passing through the interface unit 22 and is supplied to a selected magnetic head after data modulation at a data modulation/demodulation unit 27. Further, the information signal reproduced at one of the magnetic heads $42_1$–$42_n$ is transferred to the data modulation/demodulation unit 27 for demodulation, and the demodulated data thus obtained is transferred to the host CPU via the serial/parallel conversion unit 26 and the interface 22. Further, in order to facilitate the transfer of data in the control unit 20, a data transfer buffer 28 is provided in connection to the system bus 21.

Figure 8:
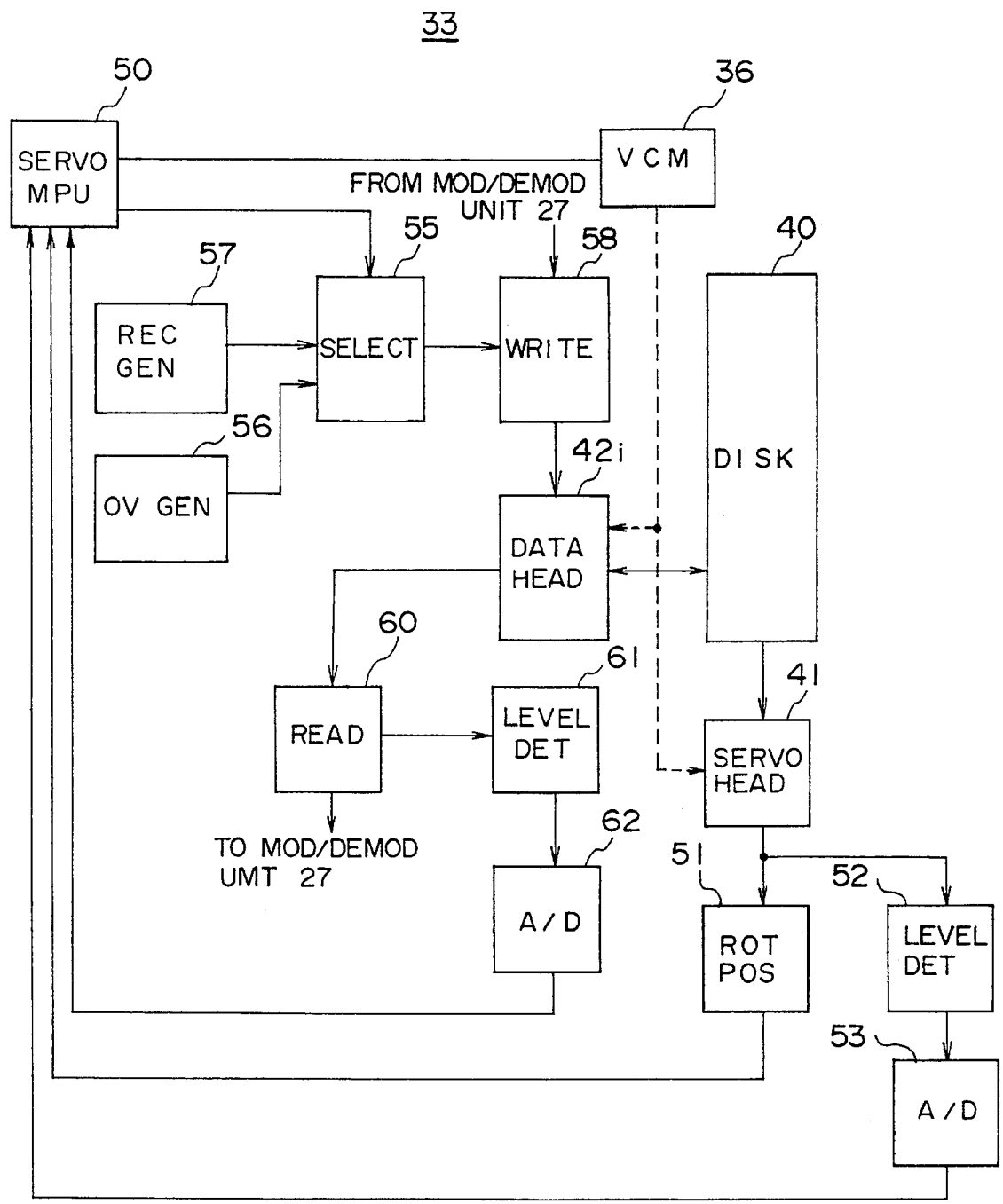
FIG. 8 is a block diagram showing the construction of the head control circuit included in the block diagram of FIG. 7.

FIG. 8 shows the construction of the head position control unit 33 of FIG. 7 in detail.

Referring to FIG. 8, the unit 33 includes a servo MPU 50 for energizing the voice coil motor 36, and a position detection unit 51 cooperates with the MPU 50 for detecting the rotational angle of the magnetic disk that is driven by the spindle motor 35. There, the unit 51 detects the rotational angle of the magnetic disks $40_0$–$40_n$ based upon a marker signal included in the servo control signal that in turn is reproduced from the servo surface of the magnetic disk $40_0$ by the magnetic head 41, and the rotational angle thus detected is fed back to the servo MPU 50 for servo control of the motor 35.

The servo control signal reproduced by the servo head 41 is further supplied to a level detector 52 for level detection, and an output signal of the level detector 52 representing the detected level of the servo control signal is supplied to the MPU 50 after conversion to digital data in an A/D converter 53. Thereby, the MPU 50 controls the voice coil motor 36 such that the servo head 41 traces the center of the track.

Figure 4A:
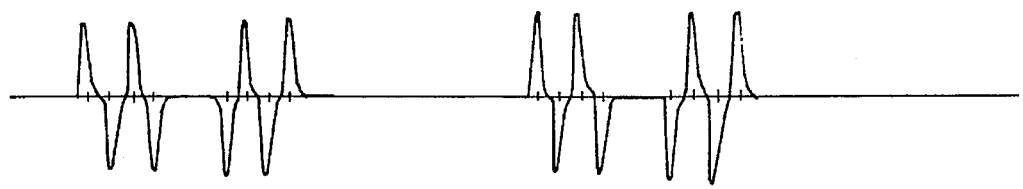
FIGS. 4(A) and 4(B) represents the waveform of the servo control signal reproduced based upon the servo pattern of FIG. 3, respectively for the case wherein the magnetic head is centered on the track and wherein the magnetic head is offset from the track.
Figure 4B:
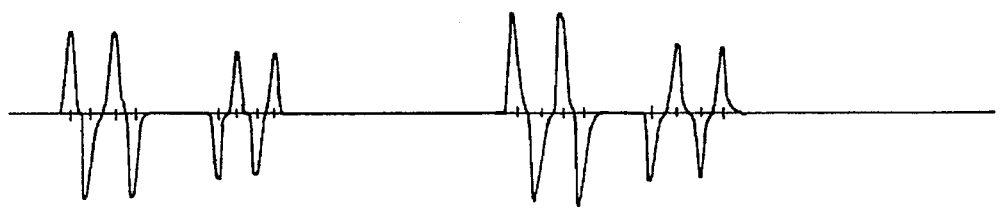
Figure 5:
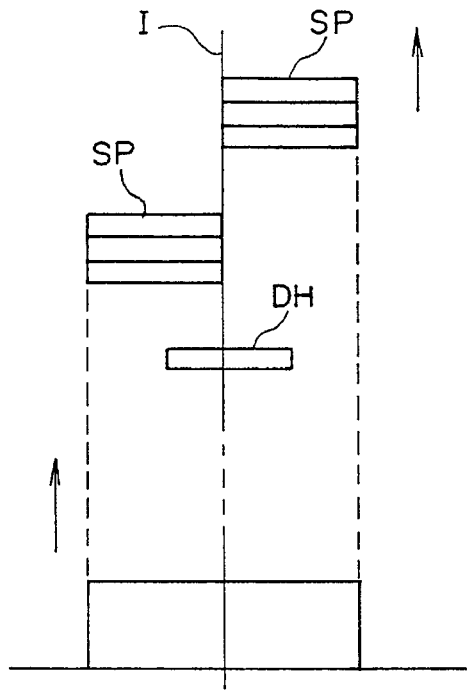
FIGS. 5(A) and 5(B) are diagrams corresponding to FIGS. 4(A) and 4(B) showing the level of the reproduced servo control signal respectively for the case wherein the magnetic head is centered on the track and wherein the magnetic head is offset from the track.
Figure 5:
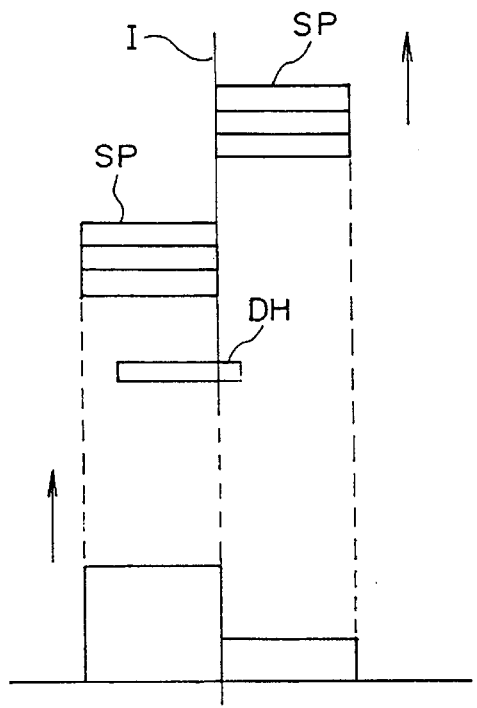

Further, the unit 33 includes a read circuit 60 connected to a magnetic head $42_i$ for reading the information signal reproduced by the magnetic head $42_i$, wherein the head $42_i$ is a magnetic head included in the magnetic heads $42_1$–$42_n$ and cooperates with a corresponding magnetic head $40_i$ for recording and/or reproducing an information signal thereon and therefrom. The magnetic head $42_i$ will be referred to hereinafter as data head for distinction over the servo head 41. The reproduced information signal is then supplied from the circuit 60 to the data modulation/demodulation unit 27 as usual and in addition to a level detection circuit 61 for level detection. There, the output signal of the read circuit 60, obtained by scanning the servo pattern on the reference track provided on the disk $40_i$, is supplied to the MPU 50 after level detection at a level detection circuit 61 and conversion to digital data in an A/D converter 62, for detection of offset of the head position with respect to the proper track that is defined on the magnetic disk $40_i$. Thereby, the MPU 50 controls the voice coil motor 36 such that the reproduced servo signals have substantially a constant amplitude as described already with reference to FIGS. 4(A) and 5(A).

Further, there is provided a write circuit 58 in cooperation with the data head $42_i$, wherein the data head $42_i$ is supplied with the information signal to be recorded from the modulation/demodulation unit 27 via the write circuit 58 as usual. In addition, the circuit 33 of FIG. 8 includes a selection circuit 55 that is activated by the servo MPU 50, wherein the selection circuit 55 supplies, upon control by the MPU 50, a rectangular signal produced by a signal generator 57 or a zero voltage signal produced by a zero voltage generator 56 selectively to the write circuit 58 for recording on the disk $40_i$ by the data head $42_i$. Thereby, the disk servo pattern as shown in FIG. 3 is recorded on the disk $40_i$ in correspondence to a track specified by the MPU 50.

Figure 9:
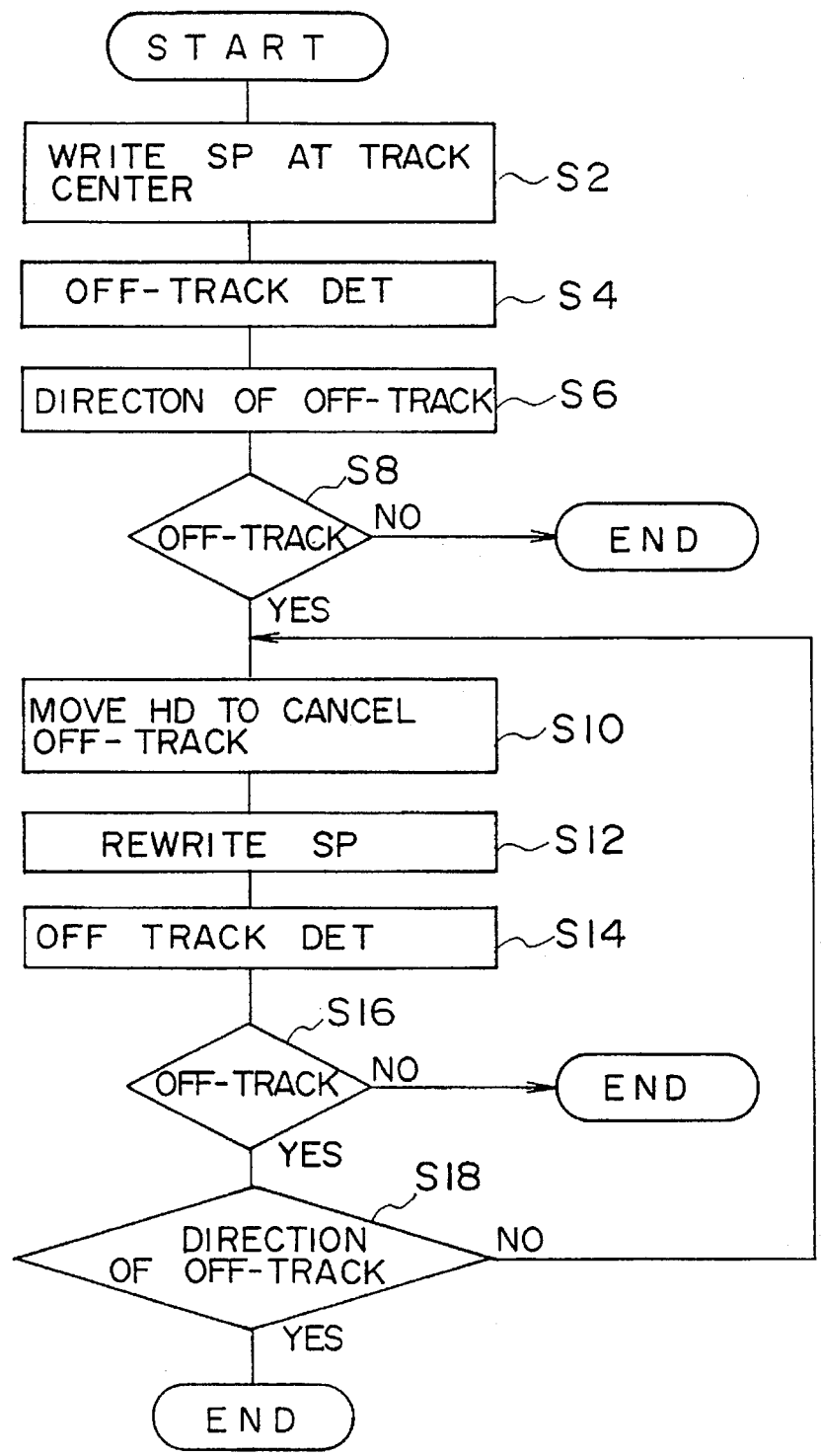
FIG. 9 is a flowchart showing the operational process of the hard disk device according to an embodiment of the present invention.

FIG. 9 is a flowchart showing a preferred embodiment of the present invention. It should be noted that the process of FIG. 9 relates to the recording of the disk servo pattern on the magnetic disk $40_i$.

Referring to FIG. 9, the process starts with a step 2 for writing the disk servo pattern on the disk $40_i$ along a predetermined track based upon the servo pattern on the servo disk $40_0$. This is achieved, after running the hard disk device for several hours for stabilizing the operational state, by reading the servo pattern on the disk $40_0$ by the servo head 41 and controlling the servo head 41 to follow the track defined on the servo disk $40_0$. As the data head $42_i$ is moved unitarily to the servo head 41, the data head $42_i$ thereby traces the track defined on the data disk $40_i$.

Figure 6A:
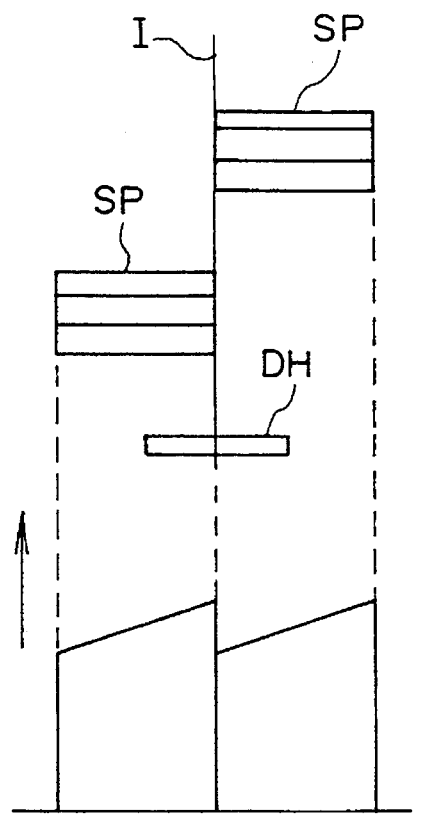
FIG. 6(A) is a diagram showing the servo control pattern recorded on the magnetic disk wherein there is an asymmetricity in the recording and reproducing characteristics of the magnetic head that is used for recording the servo control pattern.
Figure 6B:
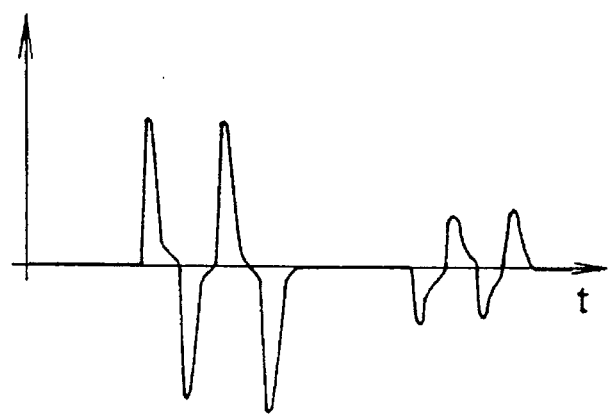
FIG. 6(B) is a diagram showing the waveform of the servo control signal reproduced from the servo control pattern of FIG. 6(A)

Next, a servo control signal is reproduced from the data servo pattern by the data head $42_i$, and the reproduced servo control signal is examined for an apparent offset of the head. When there is such an apparent offset in the head position, the signal waveform changes as shown in FIG. 6(B). The detected change of the head offset is an apparent effect as the head $42_i$ is controlled on-track based upon the servo pattern recorded on the servo disk $40_0$. It should be noted that the present process is conducted under a stabilized condition of the hard disk device.

Next, the direction and magnitude of off-track is detected in a step 6 and if it is discriminated that the magnitude of off-track is tolerable in a step 8, the process is terminated. On the other hand, if the magnitude of off-track exceeds a tolerable limit, a step 10 is conducted for moving the data head $42_i$ in the direction to cancel the off-track with a magnitude corresponding to the detected off-track magnitude. Further, while controlling the data head $42_i$ at the position for canceling out the off-track, the data servo pattern is written over the existing data servo pattern on the disk $40_i$ in a step 12. Further, the servo control signal is reproduced in a step 14 by the data head $42_i$ while controlling the head $42_i$ based upon the servo pattern on the servo disk 40 similarly to the step 4, and the offset or off-track of the head $42_i$ is detected. Again, the detected off-track is an apparent quantity and a step 16 similar to the step 8 is conducted for discriminating whether the off-track is tolerable or not.

If there is no substantial off-track detected in the step 16, the process is terminated. On the other hand, if there still exists an off-track, a step 18 is conducted for discriminating the direction of the off-track. If the direction of the off-track is the same as the direction of the off-track detected previously, this indicates that the off-track is not completely canceled, and the steps 10–18 are repeated. On the other hand, when the direction of the off-track is reversed in the step 18, the process is terminated.

Figure 10A:
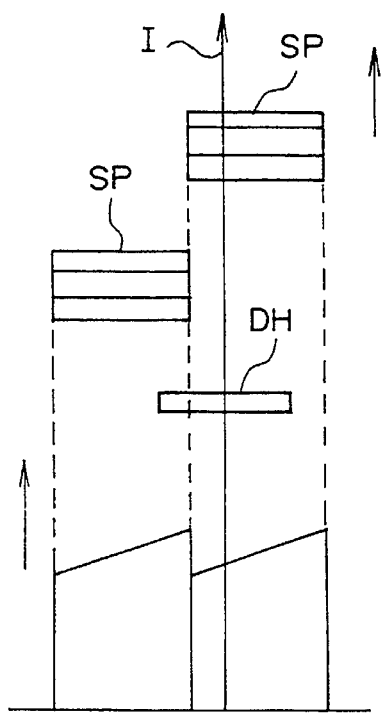
FIGS. 10(A) and 10(B) are diagrams showing the data servo pattern after the process of FIG. 9.
Figure 10B:
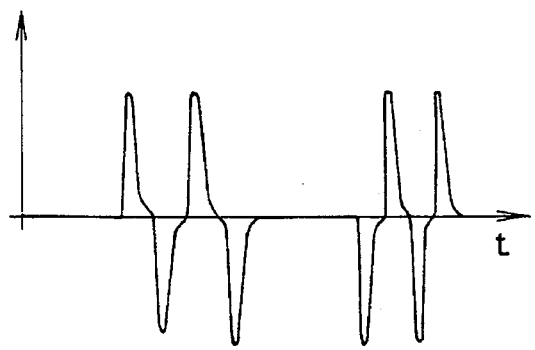

FIGS. 10(A) and 10(B) show the servo pattern SP thus formed on the data disk $40_i$ after the process of FIG. 9. It will be noted that the servo pattern SP is now offset with respect to the center I of the track as shown in FIG. 10(A), and the reproduced servo signal has a substantially constant amplitude when the data head $42_i$ (represented in FIG. 10(B) as DH) is centered on the track. In other words, by controlling the data head $42_i$ based upon the reproduced servo control signal that in turn is obtained from the servo pattern SP that is re-written by the process of FIG. 9, one can center the data head $42_i$ exactly on the center I of the track even when the servo pattern SP is recorded with an asymmetric magnetization level. It should be noted that the process of FIG. 9 may be achieved when shipping the hard disk device after assembling.

Figure 11:
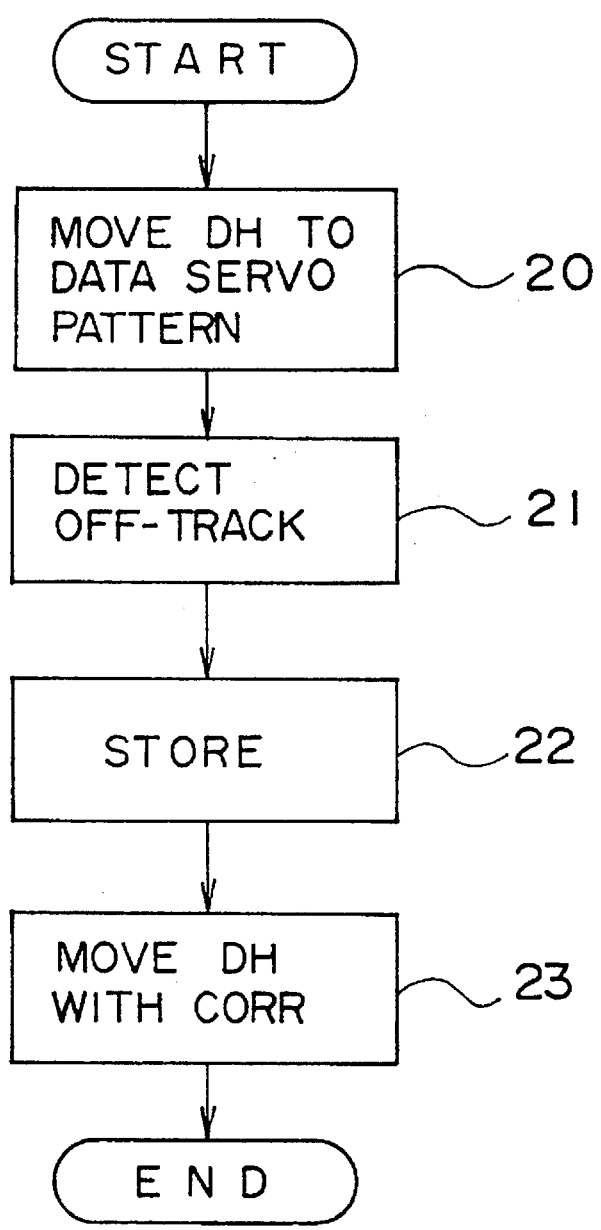
FIG. 11 is a flowchart showing the recording/reproducing operation conducted by the hard disk device based upon the process of FIG. 9.

FIG. 11 shows the process for recording and/or reproducing the information signal on and from the data disk $40_i$ after the process of FIG. 9. It should be noted that the process of FIG. 11 is conducted in the ordinary, variable temperature environment, contrary to the process of FIG. 9.

The process is a usual one and includes a step 20 for moving the data head $42_i$ to the track on the data disk $40_i$ on which the data servo pattern is carried, based upon the servo pattern on the servo disk $40_0$, and a step 21 for detecting the off-track of the head $42_i$ is conducted subsequently to the step 20 by reproducing the servo control signal from the data servo pattern that is recorded on the disk $40_0$ in the process of FIG. 9. More specifically, in the step 21, the level of the reproduced servo signal is detected and the data head $42_i$ is moved such that the reproduced servo signal shows a substantially constant level in each of the servo patterns SP.

Further, the off-track of the head thus detected is stored in a memory in a step 22, and the head $42_i$ is controlled in a step 23 based upon the servo control signal from the servo pattern on the servo disk $40_0$ but with the offset stored in the memory such that the off-track of the head $42_i$ is compensated. Thereby, one can maintain the data head $42_i$ exactly on the center of the track, even when the environmental temperature has changed during the operation of the hard disk device. The process for detecting the off-track in the steps 20 and 21 may be conducted periodically.

Further, the present invention is not limited to the embodiments described heretofore, but various variations and modifications may be made without departing from the scope of the invention.

What is claimed is:

1. A method for writing a servo pattern in an information storage device, said information storage device including a servo surface having a first servo pattern for controlling head tracking stored thereupon; a data surface; a servo head for reproducing first servo signals from said servo surface; a data head for reproducing data signals and second servo signals from said data surface; a head position detection unit for detecting positioning of said servo head based upon said first servo signals; and a data head control unit for controlling positioning of said data head based upon positioning of said servo head; said method comprising the steps of:

recording a second servo pattern for controlling head tracking on said data surface by said data head while controlling the positioning of said data head based upon the positioning of said servo head;

reproducing a second servo signal from said data surface using said data head in response to said second servo pattern while controlling the positioning of said data head based upon the positioning of said servo head;

detecting a deviation in said second servo signal that indicates an apparent off-track of said data head from said track while controlling the positioning of said data head based upon the positioning of said servo head; and re-recording said second servo pattern on said data surface without re-recording data information while shifting said data head in a radial direction of said data surface with an offset to cancel said apparent off-track.

2. A method as claimed in claim 1, wherein said step of reproducing said second servo signal, said step of detecting a deviation in said second servo signal and said step of re-recording said second servo pattern are conducted in a substantially stabilized temperature environment.

3. A method as claimed in claim 1, wherein said step of detecting the deviation in said second servo signal comprises a step of detecting a direction of shifting of said data head for reducing said apparent off-track, and said step of re-recording said second servo pattern is conducted while shifting said data head in said direction based upon said position of said servo head.

4. A method as claimed in claim 1, wherein said step of detecting the deviation in said second servo signal and said step of re-recording said second servo pattern are repeated one or more times.

5. A method as claimed in claim 3, wherein said step of detecting the deviation in said second servo signal and said step of re-recording said second servo pattern are repeated until a direction of shifting of said data head for reducing said apparent off-track is reversed.

* * * * *